Patented June 5, 1934

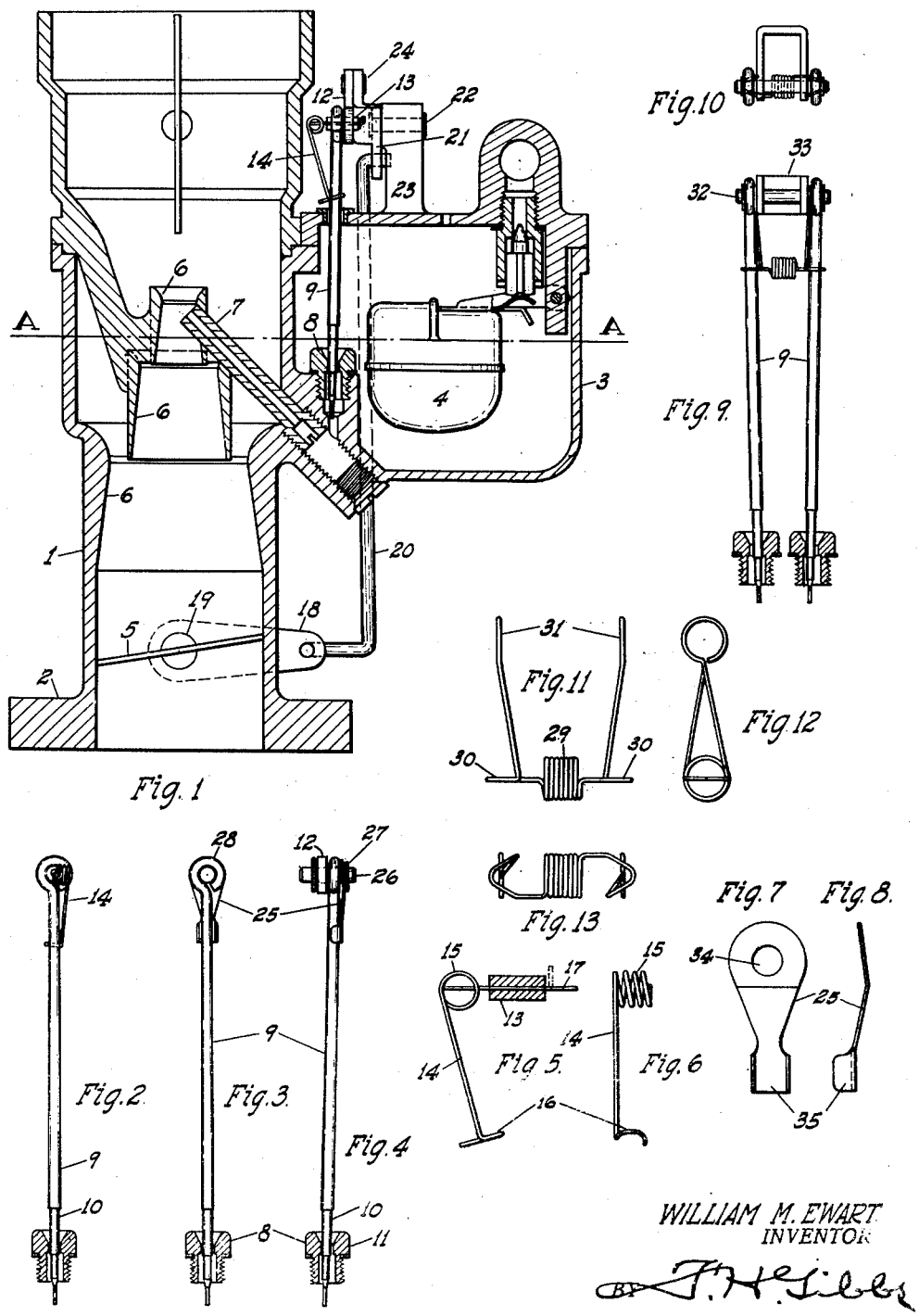

1,961,747

UNITED STATES PATENT OFFICE 1,961,747

CARBURETOR

William M. Ewart, St. Louis, Mo., assignor to Carter Carburetor Corporation, St. Louis, Mo., a corporation of Delaware Application March 20, 1933, Serial No. 661,648

5 Claims. (Cl. 137—111)

It will be understood that the invention is susceptible of many modifications, and, accordingly, I do not wish to be limited in my protection, except as set forth in the accompanying claims.

This invention relates to carburetors and particularly to devices for controlling the flow of fuel to the mixing conduit in conjunction with the requirements of the engine. According to certain well known constructions, a metering rod or valve having a plurality of different sized portions or steps thereon is inserted into a calibrated metering jet and the relative position of the valve and jet is varied in accordance with the requirements of the carburetor. This variation may be accomplished by connection of the valve with a suction operated piston which is controlled by pressure conditions in the manifold, or by a direct connection of the valve with the throttle valve. Each of these constructions have certain advantages and my invention can be used in connection with either.

A certain disadvantage about these prior constructions was that the restricting effect would vary in accordance with the eccentricity of the metering rod in the jet, and that it was difficult to keep the metering rod in any fixed position with regard to the center of the metering orifice. When large quantities of fuel were flowing thru the metering jet the normal tendency was to draw the metering rod to the center of the metering orifice while at low suction the rod was likely to contact with one side of the orifice.

I have found that the amount of fuel which will be drawn thru the orifice at a given suction will vary if the position of the metering rod is varied with respect to the center of the orifice. As long as the metering rod is in contact with one side of the orifice the flow will remain substantially the same for a given suction and as long as the rod is maintained in the center of the orifice the flow will also remain constant. If the metering rod could be accurately held in the center of the orifice without interfering with its longitudinal movement with respect thereto, the carburetor would function properly, but no practical and convenient means of doing this is available. The difference between the diameter of the rod and the orifice is frequently as small as three millimeters or smaller, and the guide for holding the rod would have to be so accurately made that the carburetor would cost too much to make. Moreover, a very small amount of wear would make the guide useless. My invention relates to the provision of means for holding the rod at one side of the orifice. With the rod held at one side of the orifice instead of at the center, a slightly different sized rod or orifice must be used, but of course this is a mere matter of calibration. To carry out my invention it is only necessary to provide a very weak spring for constantly holding the metering rod against one side of the orifice.

The invention will be better understood from the following description and accompanying drawing, referring to which:

Figure 1 is a vertical sectional view of a carburetor embodying my invention.

Figure 2 is a detail view showing a metering rod and retaining spring of the type shown in Figure 1.

Figure 3 is a detail view showing a metering rod and retaining spring according to another form of my invention.

Figure 4 shows a side view of the parts shown in Figure 3.

Figure 5 shows a side view of the retaining spring shown in Figure 2.

Figure 6 shows an end view of the retaining spring shown in Figure 5.

Figure 7 shows a slightly enlarged view of the retaining spring shown in Figures 3 and 4.

Figure 8 shows a side view of the retaining spring shown in Figure 7.

Figure 9 is a detail view showing a pair of metering rods and associated parts for use in a dual carburetor.

Figure 10 is a plan view of the parts shown in Figure 9.

Figures 11, 12 and 13 show the retaining spring of the type used in Figures 9 and 10 on a slightly enlarged scale.

The reference numeral 1 indicates the main body member of a carburetor having a flange 2 by means of which it may be attached to the manifold of an internal combustion engine. The carburetor is provided with a float chamber 3 in which a float 4 operates to maintain the fuel at substantially the level A—A. A conventional throttle valve 5 is provided and it will be understood that the usual conventional carburetor structure such as accelerating pumps and low speed fuel supply devices may be provided although they have nothing to do with this invention and are not shown.

The carburetor is provided with one or more venturis 6, of which three are shown in this particular instance, and a main nozzle 7 discharges into one of the venturis. The fuel supply for the main nozzle is furnished to the main nozzle thru the main jet 8. It will be understood that the fuel for the low speed fuel supply device may also be furnished thru this jet, although the manner in which the low speed fuel supply is connected is of little importance as far as this invention is concerned. The main jet 8 is restricted by a metering rod 9 which is provided with a plurality of different sized metering portions 10 which project into the restricted portion 11 of the main jet 8.

In the device illustrated in Figures 1, 2, 5 and 6, the metering rod 9 is pivoted on an operating link 12 by means of the pin 13. The retaining spring 14 comprises a coil 15, a hooked end 16 and a straight end 17 which is adapted to be passed thru an opening in the pin 13 and then bent over to hold it in place. The hooked end 16 is then sprung back around the metering rod and thereby serves to pull it sideways in the main jet so that it drags against one side of the restricted portion 11 thereof.

It will be understood that the metering rod is operated in the jet by means of crank 18 attached to the shaft 19 of the throttle valve 5, the crank 18 being connected by means of link 20 to a rocker arm 21, mounted on rock shaft 22. The rock shaft is carried in a suitable pillar block 23 and the rocker arm is connected to the link 12 by means of pin 24. As the throttle is opened and closed, different sized portions or steps 10 of the metering rod are moved into the restricted portion 11 of the main jet controlling the flow therethru in a manner well understood.

In the modifications shown in Figures 3, 4, 7 and 8, a sheet metal leaf spring 25 is used in place of the coil spring 14. The leaf spring is provided with an opening 34 which fits over the pin 26 and it will be understood that this pin corresponds to the pin 13 shown in Figures 1 and 5. The spring 25 is originally formed from a substantially T shaped blank, and the ends of the T are turned up to form the concave or U-shaped portion as indicated at 35. The pin 26 is provided with retaining devices 27 at each end to hold the perforated end of the spring 25 up against the eye 28 of the metering rod, pushing the rod over to the side as indicated in Figure 4.

In the device shown in Figures 9 to 13 inclusive, a pair of metering rods 9 are provided for use in a dual carburetor. The retaining spring comprises a coil 29 with loops 30 to pass around the stems of the metering rods and additional loops 31 which hook over the operating pin 32 and serve as supports. It will be understood that the operating pin 32 corresponds to the pin 13 shown in Figure 1 and the operating link 33 corresponds to the link 12 shown in Figure 1.

I claim:

1. In a carburetor, a metering passageway, a longitudinally movable metering rod movable therein of substantially less diameter than the diameter of said passageway and means for holding said metering rod against one side of said passageway.

2. In a carburetor, a metering jet having a restricted passageway portion, a metering rod of substantially less diameter than the diameter of said passageway portion entering said restricted passageway portion and adapted to variably restrict the flow therethru, and means for holding said metering rod against one side of said restricted passageway portion.

3. In a carburetor, means forming a metering jet, a metering rod passing thru said jet, said metering rod being of substantially less diameter than said jet, and a spring device holding said metering rod against one side of said jet.

4. In a carburetor, a metering rod, an operating member therefor, a jet of substantially larger diameter than said metering rod and a spring device contacting said operating member and said metering rod for holding the rod against one side of the jet.

5. In a carburetor, a metering rod, an operating member therefor, a longitudinally perforated pin connecting said metering rod and said operating member, a coil spring having two projecting ends, one of said ends passing thru said perforated pin and the other end being hooked around said metering rod.

WILLIAM M. EWART.